(12) United States Patent
Szwalbenest (10) Patent No.: US 8,818,906 B1
(45) Date of Patent: Aug. 26, 2014

(54) SYSTEMS AND METHODS FOR PERFORMING AUTHENTICATION OF A CUSTOMER INTERACTING WITH A BANKING PLATFORM

(75) Inventor: Stanley A. Szwalbenest, Newton, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 489 days.

(21) Appl. No.: 12/898,145

(22) Filed: Oct. 5, 2010

(51) Int. Cl.
*G06Q 20/00* (2012.01)

(52) U.S. Cl.
USPC ............ 705/64; 705/65; 705/66; 705/67; 705/72

(58) Field of Classification Search
CPC ............... H04L 29/06836; H04L 29/02857; H04L 63/102
USPC .................................................... 705/64–76
See application file for complete search history.

(56) References Cited

U.S. PATENT DOCUMENTS

| | | | |
|---|---|---|---|
| 7,426,530 B1 * | 9/2008 | Rosko et al. ............... 709/201 |
| 7,543,740 B2 * | 6/2009 | Greene et al. ............. 235/380 |
| 7,673,793 B2 * | 3/2010 | Greene et al. ............. 235/380 |
| 7,908,645 B2 * | 3/2011 | Varghese et al. ............ 726/4 |
| 8,136,148 B1 * | 3/2012 | Chayanam et al. ........... 726/5 |
| 8,205,790 B2 * | 6/2012 | Pennella et al. ............ 235/379 |
| 8,230,490 B2 * | 7/2012 | Zapata et al. .................. 726/9 |
| 2005/0015601 A1 * | 1/2005 | Tabi ........................... 713/182 |
| 2005/0097320 A1 * | 5/2005 | Golan et al. ................ 713/166 |
| 2005/0097362 A1 * | 5/2005 | Winget et al. .............. 713/201 |
| 2005/0193198 A1 * | 9/2005 | Livowsky ................... 713/168 |
| 2006/0036544 A1 * | 2/2006 | Dharam ........................ 705/40 |
| 2006/0282660 A1 * | 12/2006 | Varghese et al. ............ 713/155 |
| 2009/0089869 A1 * | 4/2009 | Varghese ....................... 726/7 |
| 2014/0032902 A1 * | 1/2014 | Agrawal et al. ............. 713/168 |

* cited by examiner

*Primary Examiner* — Christopher Brown
(74) *Attorney, Agent, or Firm* — Hunton & Williams LLP (57) ABSTRACT

The invention provides systems and methods of authenticating a customer device, in conjunction with a requested interaction, the customer device associated with a customer, the method performed by an authentication entity processing portion in the form of a tangibly embodied computer. The method may include receiving data from the customer device, the data related to a requested interaction of the customer device with the authentication entity processing portion, the authentication entity processing portion maintained by an authentication entity; inputting a device attribute, from the customer device, that constitutes an observed device attribute; securing a determined device attribute; performing an authentication test including comparing the observed device attribute vis-à-vis the determined device attribute; and based on the comparing, determining whether the authentication test is passed, and (i) outputting approval of the requested interaction and a new device attribute to the customer device, if the authentication test is passed; and (ii) outputting disapproval of the requested interaction, if the authentication test is not passed.

17 Claims, 10 Drawing Sheets

SYSTEMS AND METHODS FOR PERFORMING AUTHENTICATION OF A CUSTOMER INTERACTING WITH A BANKING PLATFORM

BACKGROUND OF THE INVENTION

The invention relates to performing authentication associated with an interaction, such as an Internet session, between a customer device and an authentication entity.

Various customer devices are used by respective customers to interact with an authentication entity, such as a banking platform. Such customer devices include personal computers, cell phones, land phones, and PDAs (personal digital assistants), for example. The interaction might include an Internet session between a customer's computer and a banking platform, for example. In conjunction with such interaction, it is beneficial to authenticate the customer device, However, known techniques for authenticating such customer devices are lacking.

The systems and methods of the invention address shortcomings of the known art.

BRIEF SUMMARY OF THE INVENTION

The invention provides systems and methods of authenticating a customer device, in conjunction with a requested interaction, the customer device associated with a customer, the method performed by an authentication entity processing portion in the form of a tangibly embodied computer. The method may include receiving data from the customer device, the data related to a requested interaction of the customer device with the authentication entity processing portion, the authentication entity processing portion maintained by an authentication entity; inputting a device attribute, from the customer device, that constitutes an observed device attribute; securing a determined device attribute; performing an authentication test including comparing the observed device attribute vis-à-vis the determined device attribute; and based on the comparing, determining whether the authentication test is passed, and (i) outputting approval of the requested interaction and a new device attribute to the customer device, if the authentication test is passed; and (ii) outputting disapproval of the requested interaction, if the authentication test is not passed.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of a transaction system in accordance with various embodiments of the invention will be described. As used herein, any term in the singular may be interpreted to be in the plural, and alternatively, any term in the plural may be interpreted to be in the singular.

As used herein, the terms "information" and "data" are used interchangeably.

The invention relates to manipulation of device attributes, such as "cookies," stored on a customer's processing device, such as a personal computer (PC). A "cookie" may be characterized as a string of data, such as a text string, that is stored by a customer's web browser operating on the customer's computer. The cookie may include a variety of information. The information may be encrypted to provide privacy and security.

As used herein, "device" and "customer device" are used interchangeably. As used herein, a "device" (i.e., customer device) means a processing machine, as set forth below, such as a cellular telephone, smart, phone, IPAD, TABLET PC, laptop computer, netbook, any other computer, land phone, or PDA (personal digital assistant), for example. More specifically, in one known use, the cookie is created by the particular server and is sent by the server, over the Internet, to the customer's web browser. The data in the cookie is then stored on the customer's computer, such as on the customer's hard drive. Thereafter, the web browser sends the cookie back to the server at predetermined times, such as when the web browser accesses the particular server. A cookie can be used for various purposes, such as for authentication, other identity processing, to save personal information to avoid the need for re-entry, session tracking, storing customer preferences and patterns, and other purposes. The cookie may include URL information for which that cookie is valid. Accordingly, when the browser encounters a server that matches a URL in a cookie, the browser sends the particular matching cookie to that server.

The systems and methods of the invention provide a novel approach to authentication using cookies. In particular, the invention includes manipulation of a sequence of cookies and/or utilizes particular information on the cookie, as opposed to the generally static, i.e., unchanging cookie, used in known technology. However, the invention is not limited to the use of cookies. Other device attributes may also be used, as described below.

In one embodiment, upon a customer computer accessing a server, the server prepares a first cookie—and sends that first cookie to the customer computer. Upon the customer's computer accessing the server in a subsequent session, e.g. the next day, the server retrieves the first cookie from the customer's computer, performs authentication based on that first cookie, and replaces the first cookie with a second cookie. The attributes of the second cookie are different than the first cookie, such that the server can distinguish the two apart. Accordingly, when the customer accesses the server a week later, the server looks specifically for the second cookie and not the first cookie. If the second cookie is found, the server again authenticates the customer's computer, retrieves the second cookie, and sends a third cookie. In a yet subsequent session, the server will look for that third cookie. In subsequent sessions, in a similar manner, the server will retrieve the prior cookie, authenticate if valid, and issue a further cookie.

The sequential retrieval and issuance of cookies, having identifiably different attributes, provides a very effective deterrent against a fraudster who has somehow secured a particular cookie in the sequence. It may well take a fraudster weeks and likely months to secure and attempt to fraudulently use a stolen cookie. In that time, the particular server will generally have replaced the legitimate customer's cookie multiple times. When the server is presented with an old cookie, the server will challenge the requested access. For example, the server may initiate an MFA (multi-factor authentication) request—to confirm the identity of the customer, and thus thwart the fraudster.

The invention may provide processing to address the situation where a customer uses different devices to access the particular server. For example, the server might keep track of the particular device used, and track reissued cookies accordingly. The invention may use the particular attributes of a customer's computer (device) in others ways, such as looking for particular device attributes in conjunction with authentication. Various other features are provided by the invention.

Figure 1:
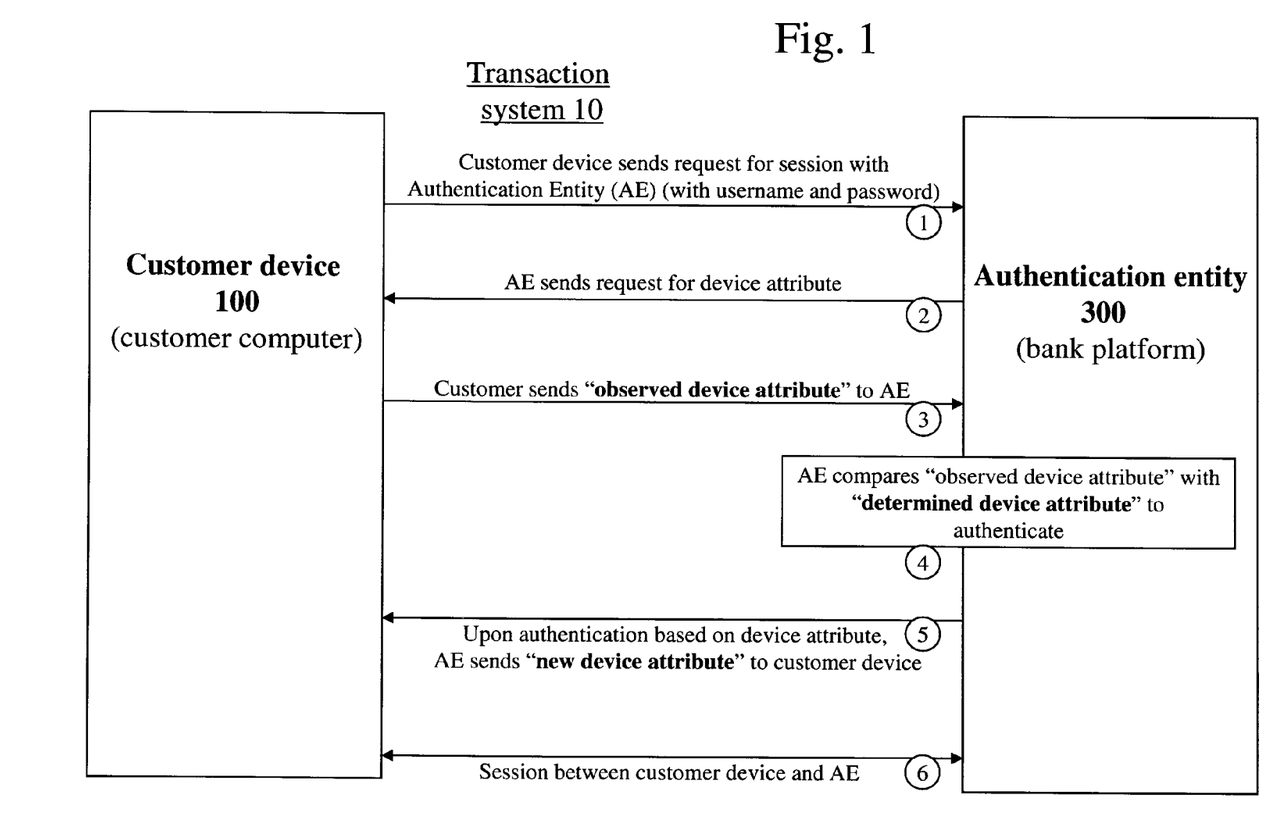
FIG. 1 is a high-level schematic diagram of a transaction system in accordance with one embodiment of the invention.

FIG. 1 is a high-level schematic diagram of a transaction system 10 in accordance with one embodiment of the invention. As shown, the transaction system 10 includes a customer device 100 and an authentication entity 300. The customer device 100 may be in the form of a personal computer such as a laptop, cell phone, PDA (personal digital assistant) or some other personal device, for example. The authentication entity 300 may be in the form of a bank processing platform, such as a server or some other computer processing system.

FIG. 1 shows high-level processing steps, in accordance with one embodiment of the invention. In particular, FIG. 1 shows communications between a customer device 100 and an authentication entity 300. As an initial step, as reflected in step (1) of FIG. 1, the customer device 100 sends a request for a session to the authentication entity (AE) 300. The requested session may, for example, include the customer logging in to a bank processing platform to perform banking related tasks, such as checking the customer's account balances, recent debits to their account, and recent deposits, for example.

As reflected in FIG. 1, the request for the session, from the customer, may include a username and password, which is authenticated by the authentication entity 300, i.e., assuming that the username and password are valid. Upon authentication of the username and password, in accordance with the invention, the authentication entity 300 initiates processing to perform "secondary device attribute authentication" associated with one or more attributes of the customer's device 100, i.e., "device attributes."

Accordingly, in step (2) of FIG. 1, the authentication entity 300 sends a request to the customer device 100 for a particular device attribute. In response, in step (3) the customer device 100 sends a response to the authentication entity 300 providing the device attribute, as requested. In particular, the device attribute sent from the customer device 100 to the authentication entity 300 might be characterized as the "observed device attribute" i.e. meaning that such was the device attribute that was observed from the customer device 100. In accordance with one embodiment of the invention, the device attribute may be a cookie, as described above.

After step (3) of FIG. 1, the process passes to step (4). In step (4), the authentication entity 300 compares the "observed device attribute" with a device attribute that the authentication entity 300 has determined should be present in a customer device, i.e., based upon data in the authentication entity 300. The device attribute that the authentication entity 300 determines should be in the customer device might be characterized as the "determined device attribute." Assuming that the "observed device attribute" (received from the customer) matches with the determined device attribute, the authentication entity 300 then authenticates the transaction. Then the processing passes to step (5) as shown in FIG. 1.

In step (5), upon authentication based on the observed device attribute that was received from the customer device 100, the authentication entity 300 then sends a "new device attribute" to the ×100. Accordingly, the new device attribute is sent in anticipation of a future session of the customer device 100 with the authentication entity 300. Thereafter, in step (6) of FIG. 1, a session is performed between the customer device 100 and the authentication entity 300 in which the customer may interface with the authentication entity 300 so as to perform any of a wide variety of activities, such as transaction processing or other requests, for example.

Figure 2:
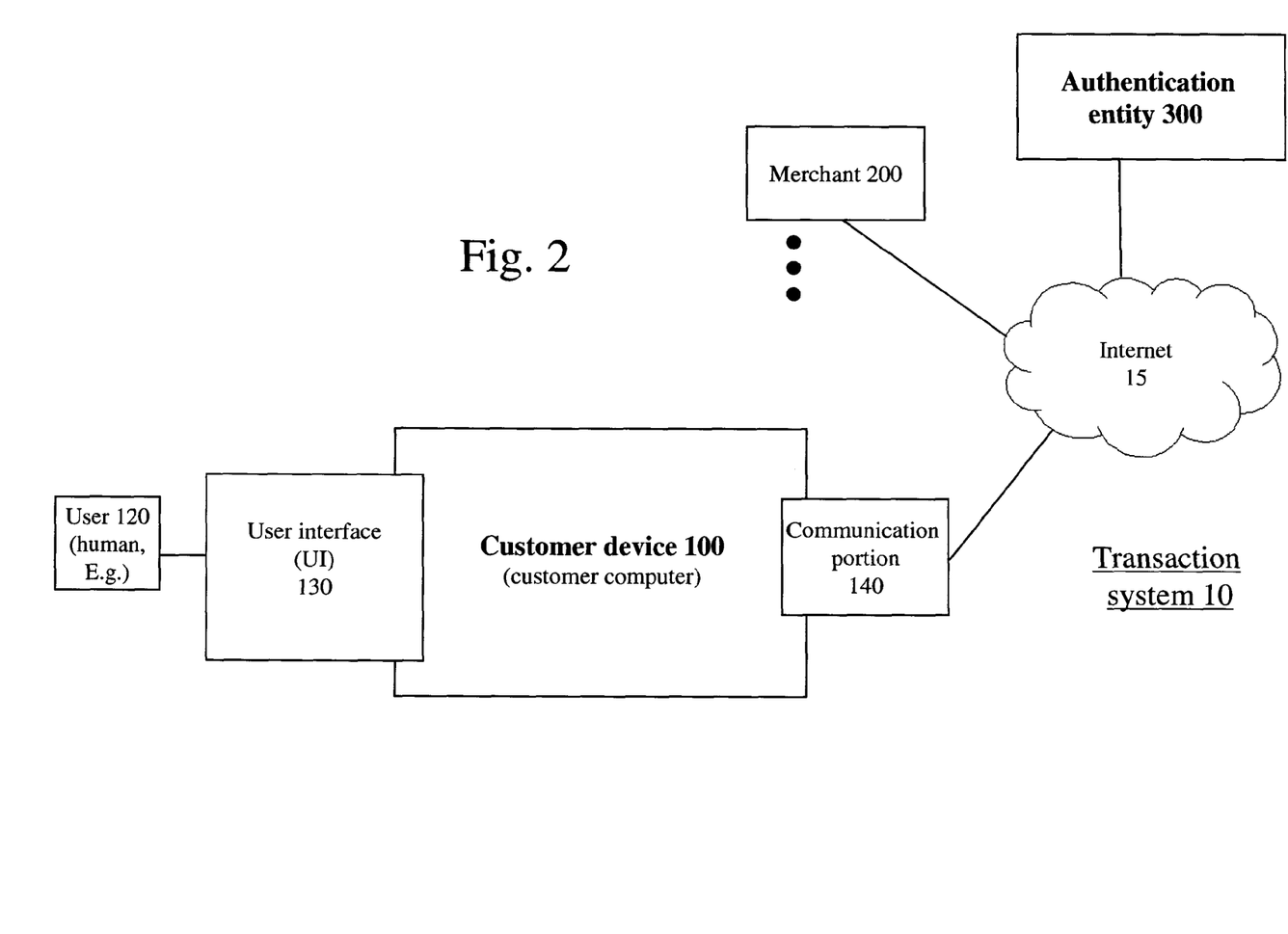
FIG. 2 is a block diagram showing further aspects of the transaction system, in accordance with one embodiment of the invention.

FIG. 2 is a block diagram showing further aspects of the transaction system 10, in accordance with one embodiment of the invention.

The transaction system 10 includes a customer device 100 and an authentication entity 300. The customer device 100 and the authentication entity 300 may interface in conjunction with various interactions, such as a session over the Internet between the customer device 100 and the authentication entity 300. The transaction system 10 may also include a merchant 200. In accordance with some embodiments of the invention, the customer device 100 may communicate with the merchant 200, and the merchant 200 in turn communicates with the authentication entity 300, i.e., such as in the situation of a requested purchase by the customer using the customer device 100 (at the merchant 200) to effect a purchase of an item.

The customer device 100 includes a user interface 130 and a communication portion 140. The user interface 130 provides for the customer device 100 to interface with a human user 120. For example, the user interface 130 might be in the form of a keyboard/monitor. The communication portion 140 provides for the customer device 100 to communicate with other processing systems, including, in particular, the authentication entity 300.

Figure 3:
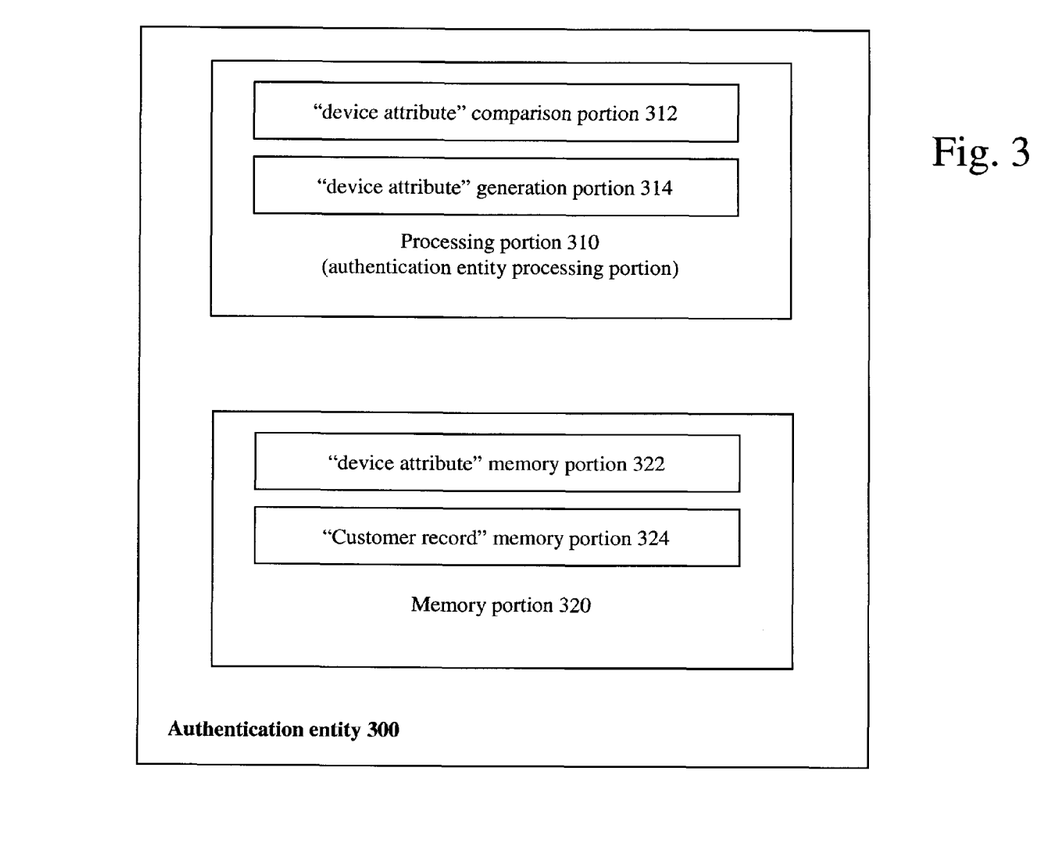
FIG. 3 is a block diagram showing further aspects of the authentication entity, in accordance with one embodiment of the invention.

FIG. 3 is a block diagram showing further aspects of the authentication entity 300, in accordance with one embodiment of the invention.

The authentication entity 300 may be in the form of a banking platform maintained by a bank, for example. The authentication entity 300 includes a processing portion 310 and a memory portion 320. The processing portion 310 may be in the form of a general purpose computer, special purpose computer, or some other tangibly embodied processing device. The memory portion 320 may be in the form of a database, for example.

The processing portion 310 performs a wide variety of processing as described herein. The processing portion 310 includes a device attribute comparison portion 312 and a device attribute generation portion 314. The device attribute comparison portion 312 may perform various processing in conjunction with comparison of device attribute, as described herein. The device attribute generation portion 314 may perform various processing in conjunction with generation of device attributes, as described herein.

The memory portion 320 is provided to store various data that is used and/or generated by the authentication entity 300. The memory portion 320 includes a device attribute memory portion 322 and a customer record memory portion 324. The device attribute memory portion 322 stores various data associated with device attributes, such as data to generate new attributes based on a particular protocol, for example. The customer record memory portion 324 stores customer records, as well as related data, in accordance with one embodiment of the invention.

Figure 10:
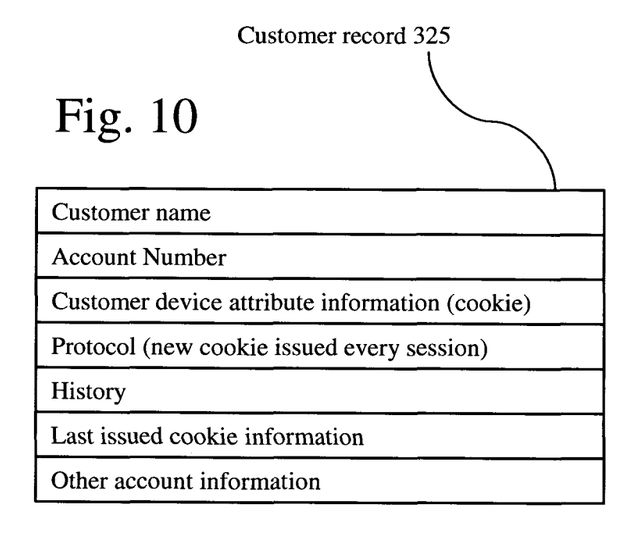
FIG. 10 is a diagram showing a customer record in accordance with one embodiment of the invention.

FIG. 10, described further below, is a diagram showing a customer record 325 in accordance with one embodiment of the invention. The customer record 325 is stored in the customer record memory portion 324 in one embodiment. As shown, the customer record 325 includes a customer name and account number. The customer record 325 also includes customer device attribute information (e.g. cookie information), protocol (new cookie issued every session), history, last issued cookie information, and other account information. However, various other and/or different information may be stored in and/or associated in some manner to, the customer record 325.

As described above and shown in FIG. 10, "other account information" may be stored in the customer record 325 and used in the processing as described herein. In particular, the authentication entity 300 may have to coordinate device attributes for multiple accounts of the customer for multiple devices of the customer. That is, any device attribute processing for one account may be taken into account for device attribute processing in other account (or accounts) of the customer, in accordance with one embodiment of the invention.

Figure 4:
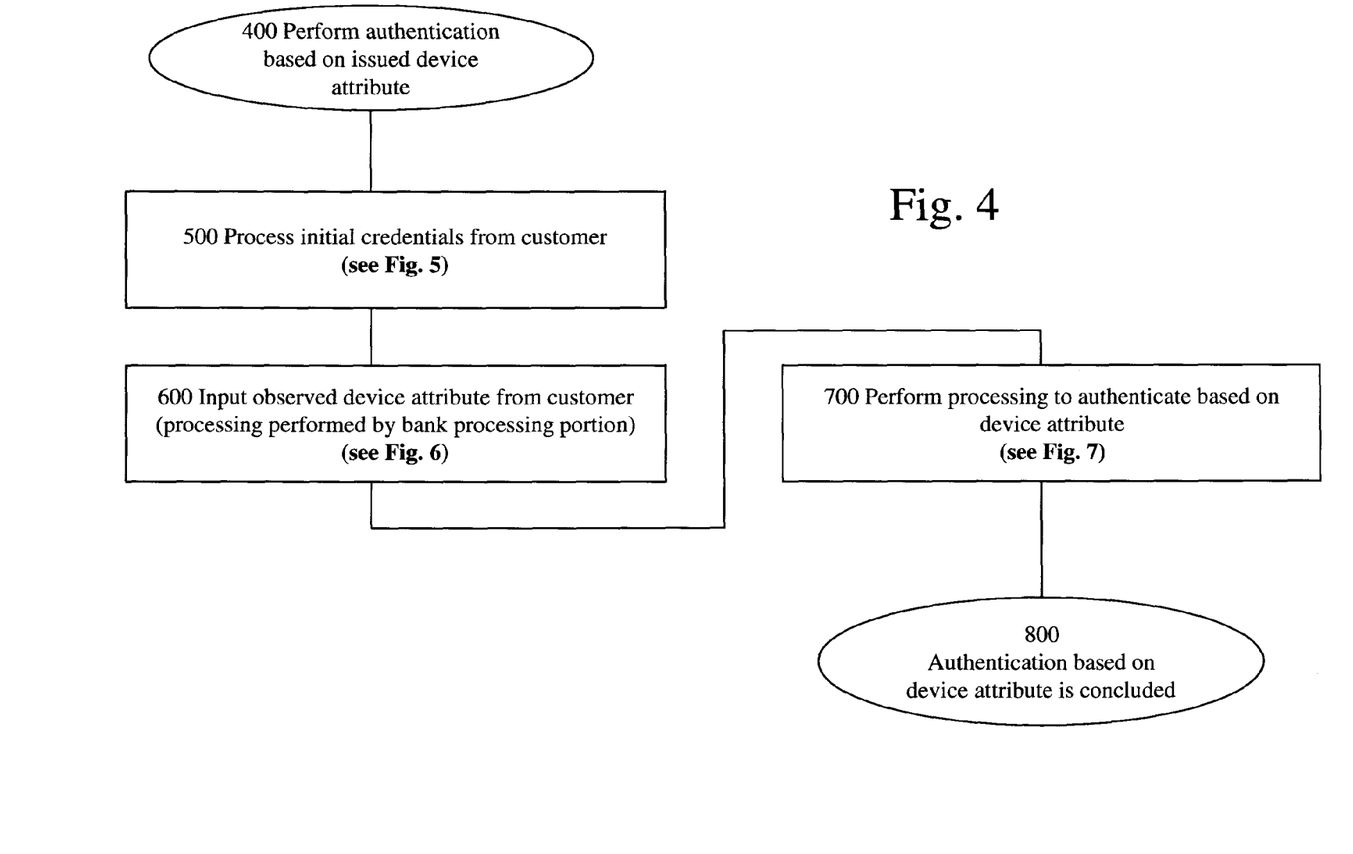
FIG. 4 is a high level flow chart showing aspects of "secondary device attribute authentication" processing performed by the transaction system, in accordance with one embodiment of the invention.

FIG. 4 is a high level flowchart showing aspects of "secondary device attribute authentication" processing performed by the transaction system 10, in accordance with one embodiment of the invention. In particular, FIG. 4 and the related FIGS. 5-9 show various aspects of the secondary device attribute authentication processing. The various processing may be performed generally by the processing portion 310, or more specifically by the device attribute comparison portion 312 or device attribute generation portion 314.

Figure 5:
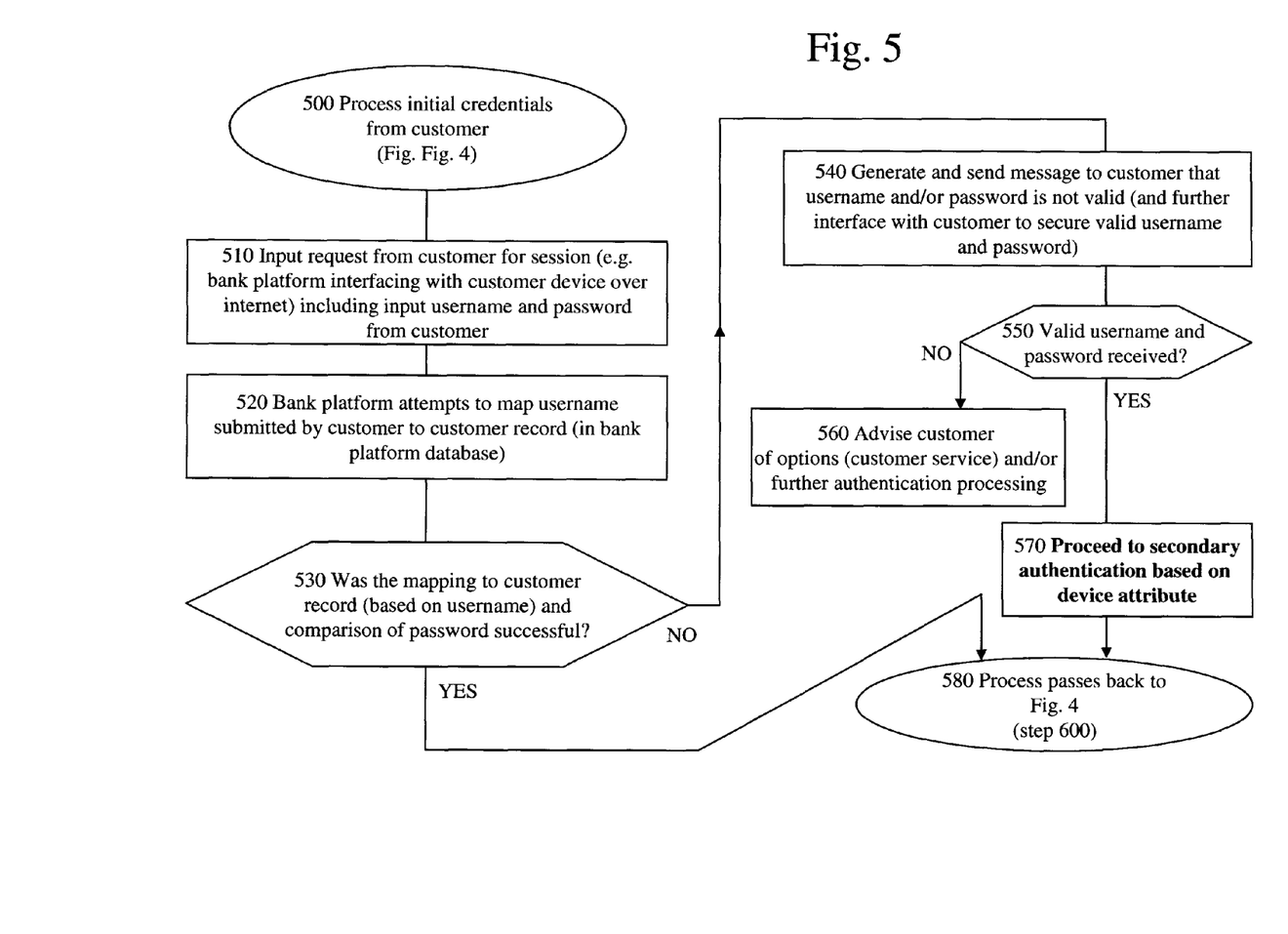
FIG. 5 is a flowchart showing in further detail the "process initial credentials from customer" processing of FIG. 4, in accordance with one embodiment of the invention.
Figure 6:
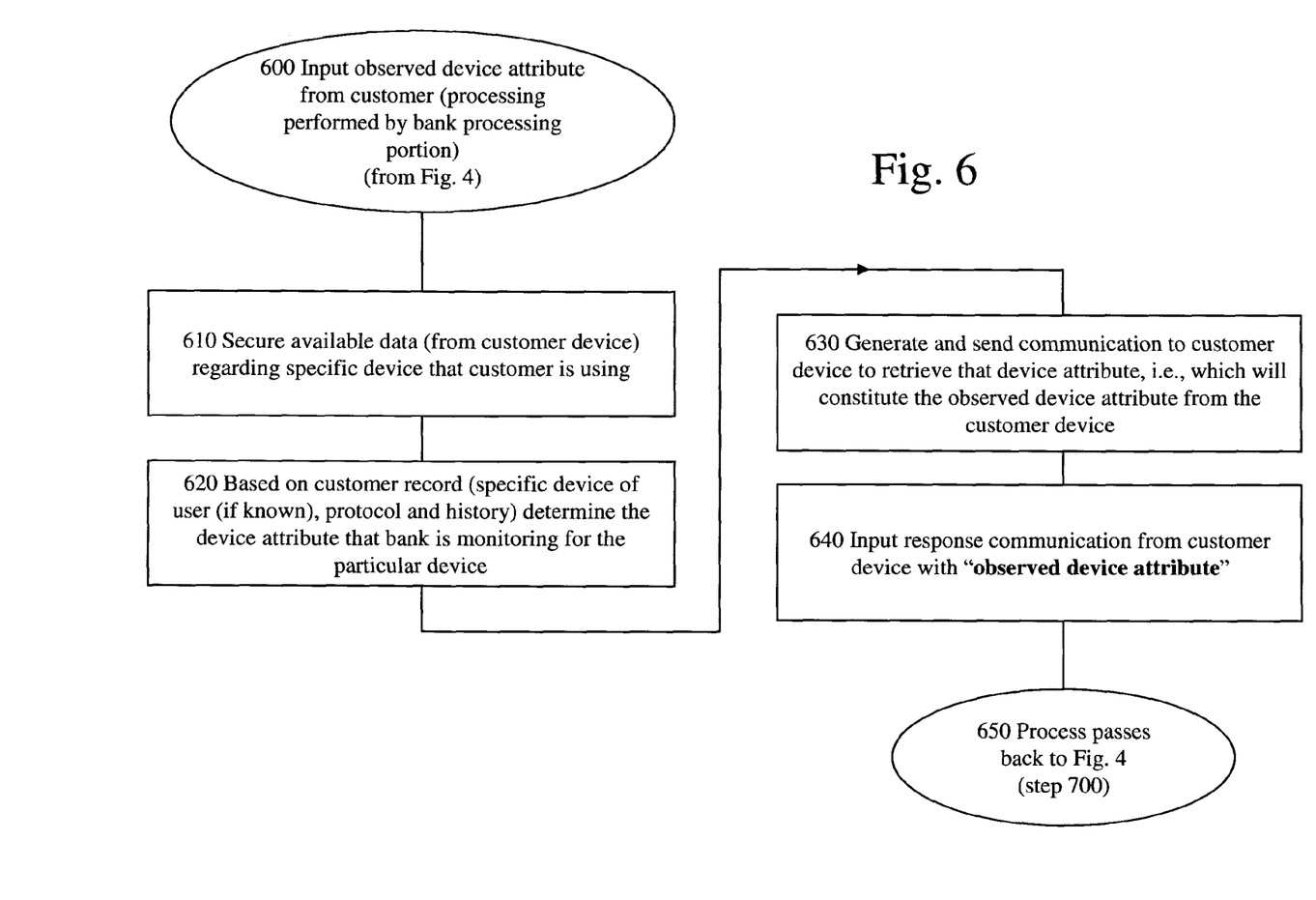
FIG. 6 is a flowchart showing in further detail the "input observed device attribute from customer" processing of FIG. 4, in accordance with one embodiment of the invention.

As shown in FIG. 4, the process starts in step 400 and passes to step 500. In step 500, the authentication entity 300 receives initial credentials, such as username and password from the customer device 100. Further details of the processing of step 500 are shown in FIG. 5 and described below. After step 500 of FIG. 4, the process passes to step 600. In step 600, the authentication entity 300 inputs an "observed device attribute" from the customer device 100. Further details are shown in FIG. 6 and described below.

Figure 7:
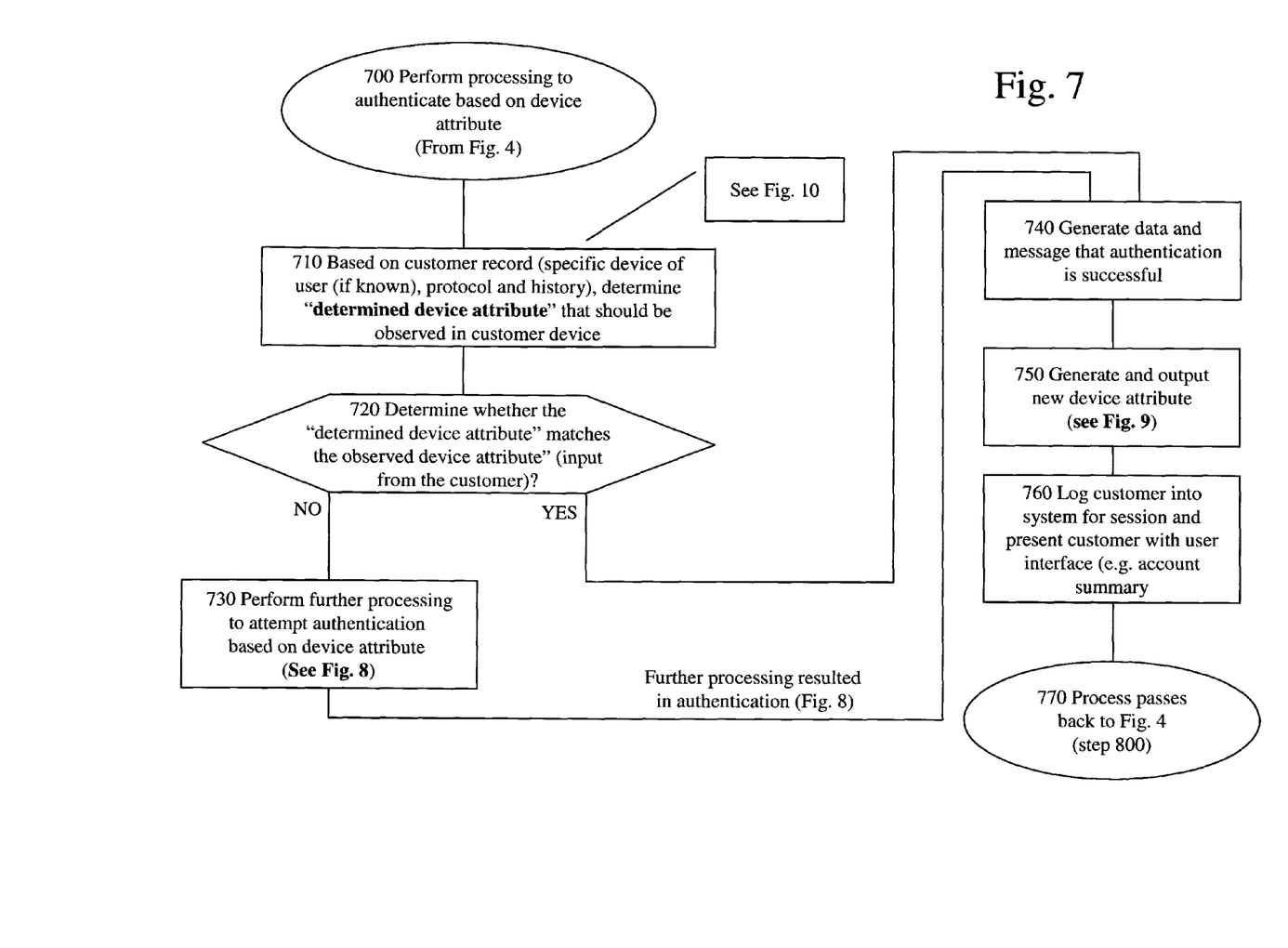
FIG. 7 is a flowchart showing in further detail the "perform processing to authenticate based on device attribute" processing of FIG. 4, in accordance with one embodiment of the invention.

After step 600, the process passes to step 700 of FIG. 4. In step 700, the authentication entity 300 performs processing to authenticate the customer device 100 based on the device attribute that was received from the customer device 100. Further details of the processing of step 700 are shown in FIG. 7.

After step 700, the process passes to step 800. In step 800, the authentication based on the device attribute of the customer's device 100 is concluded, i.e., the secondary device attribute authentication is concluded.

FIG. 5 is a flowchart showing in further detail the "process initial credentials from customer" processing of step 500 of FIG. 4, in accordance with one embodiment of the invention. As shown, the process of FIG. 5 starts in step 500 and passes to step 510. In step 510, the authentication entity 300 inputs a request from the customer, i.e., from the customer device 100 for a session with the authentication entity. For example, as described above, such a session request may be in the form of a bank platform interfacing with a customer device, i.e., a customer computer, over the Internet. In the request that is input from the customer, data is received from the customer that includes both username and password, for example. After step 510, the process passes to step 520.

In step 520, the authentication entity 300 attempts to map the username that was submitted by the customer to a customer record that is stored in the database of the authentication entity 300. After step 520, the process passes to step 530. In step 530, the authentication entity 300 determines whether the mapping to a customer record (based on the username) and the comparison of the password that was found in the customer record (vis-à-vis the password submitted by the customer) was successful. In other words, did the username and password submitted by the customer match with those stored in the authentication entity 300. If NO in step 530, i.e., there was not a match, then the process passes to step 540 of FIG. 5.

In step 540, the authentication entity 300 generates and sends a message to the customer that the username and/or password submitted by the customer is not valid. The authentication entity 300 may then further interface with the customer to secure valid username and password information. Accordingly, in step 550, a determination is made of whether a valid username and password (or other credentials) were indeed ultimately received. If YES, then the process passes to step 570. In step 570, the process proceeds to secondary authentication based on device attribute. That is, the process passes to step 580 of FIG. 5 and then returns to step 600 of FIG. 4.

It should be appreciated that the processing of the invention is not limited to username and password, as described above. Rather, credentials of other nature or other name may be utilized in the processing of initial credentials, such as in step 510, described above.

With further reference to FIG. 5, if NO in step 550, i.e., a valid username and password were not received, then the processing of FIG. 5 passes to step 560. In step 560, the authentication entity 300 advises the customer that they cannot be authenticated, and advises the customer of options and/or further authentication processing that may be relied upon in lieu of the customer providing an appropriate username and password. For example, in step 560, the customer may simply be referred to customer service of the particular bank, for example. It is appreciated that various known processes may be utilized in conjunction with the customer's submission of username, password, or similar credentials. In particular, single sign on technology may be utilized and related processing, such as that disclosed in U.S. Pat. No. 7,426,530 issued Sep. 16, 2008 and entitled "System and method for providing customers with seamless entry to a remote server" which is incorporated by reference herein in its entirety.

Returning to step 530 of FIG. 5, described above, if YES in step 530, i.e., the mapping to the customer record (based on the username and password) was successful, then the processing passes immediately to step 580 of FIG. 5. As described above, in step 580, the process passes back to FIG. 4 and step 600.

FIG. 6 is a flowchart showing in further detail the "input observed device attribute from customer" processing of step 600 of FIG. 4, in accordance with one embodiment of the invention. As shown in FIG. 6, the process starts in step 600 and passes to step 610.

In step 610, the authentication entity 300 secures available data from the customer's device regarding the specific device that the customer is using. For example, the authentication entity 300 sends a communication to the ×100 requesting information as to what device the customer is using. However, such device information may be secured (by the authentication entity 300 from the 100) in any other manner, as desired. For example, device information may be secured even with the initial communication from the customer device. After step 610, the process passes to step 620.

In step 620, the authentication entity 300 determines what device attribute that the bank is monitoring for the particular device of the customer. That is, based on the information in the customer record, as well as other information that is available to the authentication entity 300, the particular device attribute is determined. For example, the device that the customer is using may be determined to be a personal computer. Further, the customer record may reflect that a cookie is issued every time the customer requests a session with the authentication entity 300. Accordingly, the protocol associated with this particular customer is the issuance of a cookie upon each session. Relatedly, the history information contained in the particular customer's record may include the details of the last cookie that was issued to the customer's device. This information allows the authentication entity 300 to determine specifically determine what information should be retrieved from the customer device 100 (for purposes of authentication of the customer's device).

After step 620 of FIG. 6, the process passes to step 630. In step 630, the process generates and sends a communication to the customer device to retrieve that device attribute, i.e., the specific device attribute which the authentication entity 300 has determined should be checked. The device attribute that is received back from the customer device will constitute the "observed device attribute" from the customer device. After step 630 of FIG. 6, the process passes to step 640. In step 640, the authentication entity 300 inputs a responsive communication (from the customer device) with the observed device attribute. That is, assuming that the request was successfully received by the customer device 100 and was successfully responded to by the customer device 100. After step 640, the process passes to step 650 of FIG. 6. In step 650, the process passes back to FIG. 4 and step 700.

FIG. 7 is a flowchart showing in further detail the "perform processing to authenticate based on device attribute" processing of step 700 of FIG. 4, in accordance with one embodiment of the invention. As shown in FIG. 7, the process starts in step 700 and passes to step 710.

In step 710, the authentication entity 300, determines the "determined device attribute" that should be observed in the customer device, as described below with reference to FIG. 10.

Then, the process passes to step 720 of FIG. 7. In step 720, the authentication entity 300 determines whether the "determined device attribute" matches the "observed device attribute." If NO, then the process passes to step 730. In step 730, the authentication entity 300 performs further processing to attempt authentication based on the device attribute or attributes. Such further processing is shown in FIG. 8 and described below.

Figure 9:
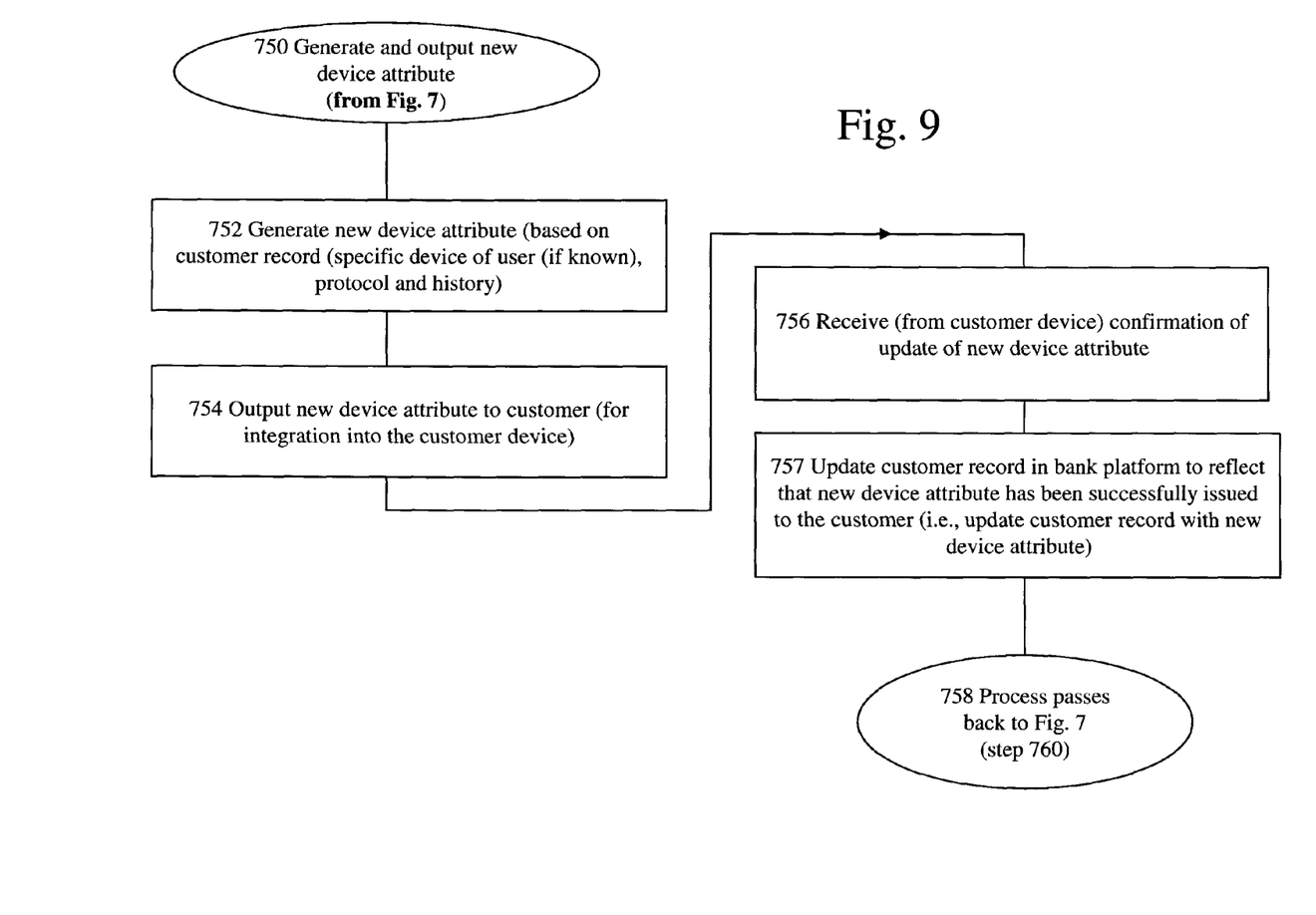
FIG. 9 is a flowchart showing in further detail the "generate and output new device attribute" processing of FIG. 7, in accordance with one embodiment of the invention.

On the other hand, if YES in step 720, i.e., the authentication entity 300 determines that there was a match between the determined device attribute and the observed device attribute, then the process passes to step 740. In step 740, the authentication entity 300 generates data reflecting a match and a message to the customer that authentication is successful. Or alternatively, the authentication entity 300 simply logs the customer onto the authentication entity 300. Then, in accordance with one embodiment, before the session with the customer is initiated, in step 750, the authentication entity 300 generates and outputs a new device attribute. Such details are shown in FIG. 9 and described below.

After step 750 of FIG. 7, the process passes to step 760. In step 760, in this embodiment, the authentication entity 300 logs the customer into the system for their session and presents the customer with a suitable user interface. That is, the user interface presented to the customer may be any of a variety of user interfaces to assist in the business of the customer, such as a listing of accounts and transactions associated with those accounts, as well as balances, for example. After step 760 of FIG. 7, the process passes to step 770. In step 770, the process passes back to FIG. 4 and step 800.

Figure 8:
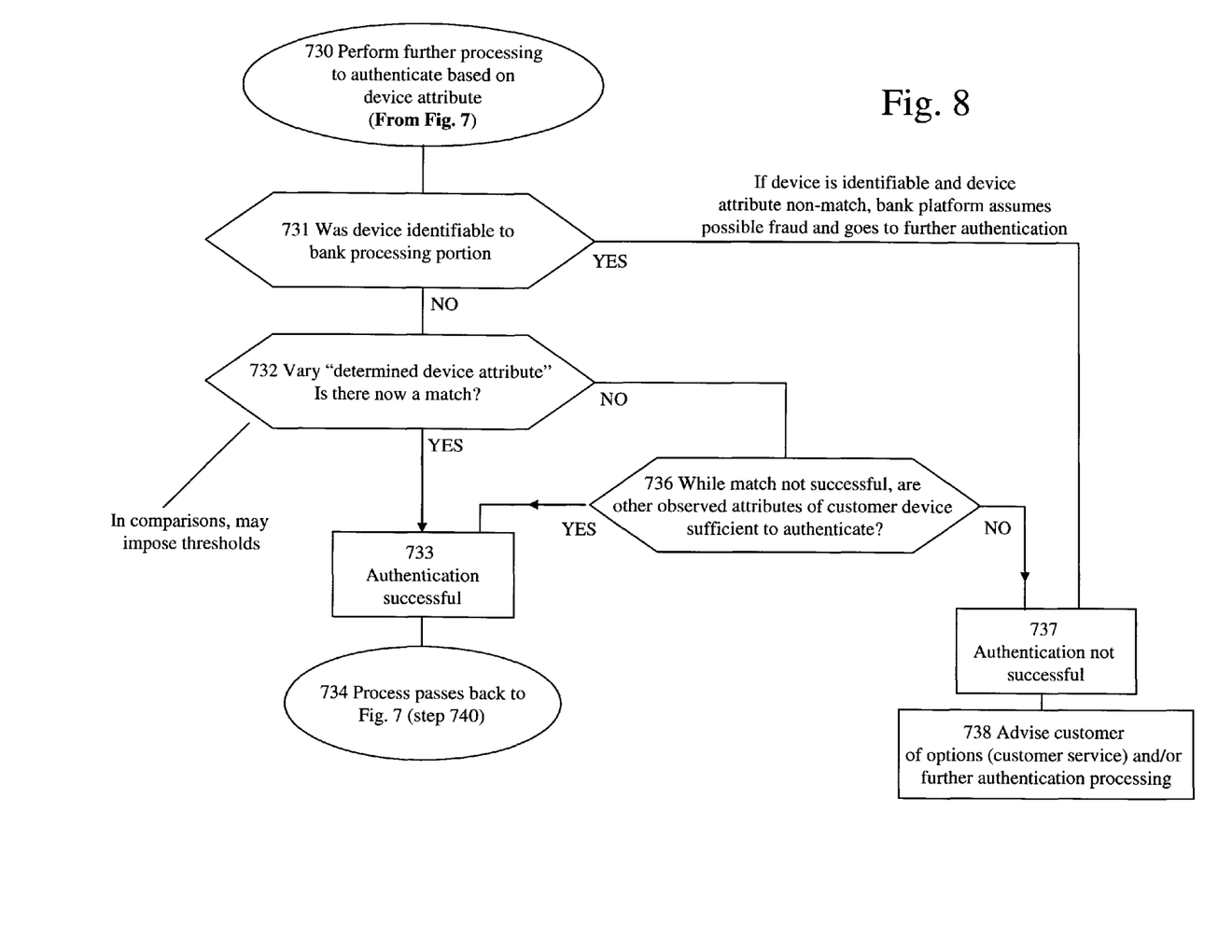
FIG. 8 is a flowchart showing in further detail the "perform further processing to authenticate based on device attribute" processing of FIG. 7, in accordance with one embodiment of the invention.

FIG. 8 is a flowchart showing in further detail the "perform further processing to authenticate based on device attribute" processing of step 730 of FIG. 7, in accordance with one embodiment of the invention. That is, the processing of FIG. 8 is directed to the situation where further processing is performed to try to attain a match between the observed device attribute and the determined device attribute, so as to authenticate the customer. As shown in FIG. 8, the process starts in step 730 and passes to step 731.

In step 731, the authentication entity 300 determines whether the customer device was identifiable to the bank processing portion. If yes, then the processing of FIG. 8 passes to step 737. That is, in accordance with one embodiment of the invention, if it is deemed that the device was clearly identifiable and that the device attribute, i.e., the observed device attribute, did not match the determined device attribute, then the authentication entity 300 assumes that there is possible fraud. Under this assumption, no further authentication processing is performed in conjunction with the device attribute and the particular session request from the customer. Rather, the customer might be directed to customer service and/or yet further authentication approaches. Such further authentication approach might include the authentication entity 300 contacting the customer via a separate channel. For example, if the customer is attempting to log on to the authentication entity 300 over the internet using a personal computer, then the authentication entity 300 may initiate a phone call to the customer via that customer's cell phone.

Accordingly, step 737 of FIG. 8 reflects that the authentication was not successful. Step 738 reflects the authentication entity 300 advising the customer of options such as customer service and/or other authentication options such as authentication over a separate channel, as described above.

It is appreciated that various scenarios may result in failure to authenticate based on a "device attribute" as described herein. For example, a cookie that was placed on a customer's computer by the authentication entity 300 may have been removed, i.e., such as by a "remove cookies" operation performed by the user. In another scenario, a particular device attribute, which the authentication entity 300 retrieved for authentication as described herein, may have been changed for some reason, i.e., such as by a maintenance procedure performed on the customer device.

In any scenario in which there is failure to authenticate based on a "device attribute" as described herein, various protocols, i.e., processes, may be imposed. For example, it might be the protocol that rare failures will simply be ignored in processing a transaction. That is, if failure to authenticate based on a "device attribute" only occurs 1 out of 10 transaction or less, then such failure will be ignored. The threshold may be varied, of course, as desired.

In embodiments of the invention, a failure to authenticate based on a "device attribute" may result in other authentication processes being performed. Such other authentication processes might include an authentication on another channel, e.g. if the customer's initial transaction request originated from a computer, then authentication on another channel might be a phone call to the customer (advising of the transaction and requesting particular information, such as the customer's personal identification number).

In the case of failure to authenticate based on a "device attribute" as described herein, any combination of the above failure protocols/processes, as well as other known protocols/processes, may be used as desired.

With further reference to step 731 of FIG. 8, if NO in step 731, i.e., the device was not identifiable to the authentication entity 300, then the process passes to step 732. In step 732, the authentication entity 300 might vary the determined device attribute in some manner. For example, if the customer has historically accessed the authentication entity 300 via different devices, then the authentication entity 300 might check the observed device attribute against a determined device attribute for each of the customer's respective devices. This might be performed in a situation where the authentication entity 300 cannot clearly determine which device the customer is using to access the authentication entity 300 for their desired session.

Alternatively, or in addition, the authentication entity 300 might vary the determined device attribute in other ways. For example, if the device attribute is based on a counter, then the authentication entity 300 might calculate the determined device attribute for surrounding counter values. For each of those surrounding counter values, the authentication entity 300 might then compare such determined device attribute vis-à-vis the observed device attribute received from the customer device. Accordingly, various processing may be performed in an attempt to secure a match between the determined device attribute vis-à-vis the observed device attribute received from the customer.

Yet further, it is appreciated that the authentication entity 300 may use a plurality of device attributes in conjunction with each other. Such processing of device attributes might be performed as a matter of routine, such as when enhanced security is desired, e.g. with a transaction involving a large value. Such processing of device attributes might also be performed when the authentication of one device attribute is questionable.

After such processing of step 732, if there is still not a match, then the process passes to step 736.

In step 736, the authentication entity 300 determines whether other observed attributes of the device are sufficient to authenticate the session. That is, step 736 reflects a situation in which the authentication entity 300 cannot obtain a match between the determined device attribute and the observed device attribute. However, there may be other information that is secured from the customer that legitimizes the customer's requested interaction, e.g. session. In step 736, if it is determined that authentications can still not be granted, then the process passes again to step 737.

On the other hand, in step 732, if the authentication entity 300 determines that there is indeed a match, then the process passes to step 733. Also, if the authentication entity 300 determines in step 736 that indeed there were other observed attributes of the customer sufficient to authentication, then the process passes to step 733.

In step 733, the authentication entity 300 deems the authentication was successful and processing thereafter passes to step 734 of FIG. 8. In step 734, the process passes back to FIG. 7 and step 740.

FIG. 9 is a flowchart showing in further detail the "generate and output new device attribute" processing of step 750 of FIG. 7, in accordance with one embodiment of the invention.

As shown in FIG. 9, the process starts in step 750 and passes to step 752. In step 752, the authentication entity 300 generates a new device attribute. Such generation of the new device attribute might be based on various information in the customer record such as the specific device of the user, if known, the protocol implemented for the particular user, as well as the history. For example, it may be determined that a new cookie should be issued to the user's personal computer, with the cookie based on a counter that is incremented. After step 752 of FIG. 9, the process passes to step 754.

In step 754, the authentication entity 300 proceeds to output the new device attribute to the customer. Accordingly, such output new device attribute is received by the customer device and integrated into the data of the customer device. In a further session at some future time, the new device attribute that was output to the customer will be sent from the customer device to the authentication entity 300 for purposes of authentication, as described above. Accordingly, the "new device attribute," as described in conjunction with step 754 of FIG. 9, will constitute the observed device attribute in such future session.

After step 754 of FIG. 9, the process passes to step 756. In step 756, the authentication entity 300 receives, from the customer device, confirmation of the update of the new device attribute in the customer's device. Then, in step 757, the authentication entity 300 updates the customer record in the authentication entity 300 to reflect that the new device attribute has been successfully issued to the customer device 100. Accordingly, such update to the customer record may include inclusion of the particular device attribute that was sent to the customer device. Alternatively, the update to the customer record might include the particular protocol upon which the new device attribute was generated. Such update to the customer record will allow the authentication entity 300, at some future time when the customer requests a further session, to generate an appropriate "determined device attribute."

After step 757 of FIG. 9, the process passes to step 758. In step 758, the process passes back to FIG. 7 and step 760. As described above, in step 760, of FIG. 7, the customer is logged in for their requested session. Processing then continues as described above.

It is appreciated that the "device attribute" authentication described herein may be used with a wide variety of operating systems. Examples of such operating systems are set forth herein. However, it is appreciated that not every device attribute is usable, in the practice of the invention, on every operating system. Thus, for example, a "cookie" attribute (as described herein) could not, of course, be used on an operating system that does not support cookies. Relatedly, it may be needed for the authentication entity 300 to determine which operating system is used by the customer. Such determination would allow the authentication entity 300 to utilize a device attribute that would be workable in such operating system.

In accordance with further aspects of the invention, it is appreciated that information that is not "device attribute" information may be used in conjunction with the processing as described herein. That is, other information may be used in conjunction with the device attribute related processing as described herein. For example, date information, time information, merchant information, geographical information, and other information may be used in conjunction with device attribute. As an example, as consistency of geographical location of transactions (of a particular customer) is less, then stricter comparison of device attributes might be demanded by the authentication entity 300, i.e., in that less consistent geographical location may be indicative of fraud. Hereinafter aspects of implementation will be described.

As described above, embodiments of the system of the invention and various processes of embodiments are described. The system of the invention or portions of the system of the invention, including but not limited to both the customer device described herein and/or the authentication entity described herein, may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the systems or devices described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, a cellular telephone, smart, phone, WAD, TABLET PC, laptop computer, netbook, land phone, PDA (personal digital assistant), or any other device, i.e., machine, or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the OS/4™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example. As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method of authenticating a customer device, in conjunction with a requested interaction, the customer device associated with a customer, the method performed by an authentication entity processing portion in the form of a tangibly embodied computer, the method including:

receiving data from the customer device, the data related to a requested interaction of the customer device with the authentication entity processing portion, the authentication entity processing portion maintained by an authentication entity, wherein the data comprises a username and password;

inputting a device attribute, from the customer device, that constitutes an observed device attribute;

securing a determined device attribute wherein the determined device attribute further comprises one or more of: date information, time information, merchant information and geographical information;

performing an authentication test including comparing the observed device attribute vis-à-vis the determined device attribute; and based on the comparing, determining whether the authentication test is passed, and outputting approval of the requested interaction and a new device attribute to the customer device, if the authentication test is passed; and outputting disapproval of the requested interaction, if the authentication test is not passed; creating a varied device attribute by performing a calculation on the determined device attribute, based at least in part on whether the authentication test is passed; and performing an additional authentication test comparing the observed device attribute and the varied determined device attribute.

2. The method of claim 1, wherein the securing a determined device attribute includes the authentication entity processing portion retrieving the determined device attribute from a database of the authentication entity.

3. The method of claim 1, wherein the securing a determined device attribute includes the authentication entity processing portion calculating the determined device attribute based on data retrieved from a database of the authentication entity.

4. The method of claim 1, the inputting a device attribute, from the customer device, that constitutes an observed device attribute including:
   sending a query to the customer device, the query requesting a specific device attribute from the customer device; and
   inputting a query response, which constitutes a response to the query, from the customer device, the query response including the observed device attribute.

5. The method of claim 1, wherein the authentication entity is a bank.

6. The method of claim 1, the method including receiving the data directly from the customer device.

7. The method of claim 6, the requested interaction of the customer device with the authentication entity constituting a session over the Internet between the customer device and the authentication entity.

8. The method of claim 1, the requested interaction of the customer device with the authentication entity constituting a session over the Internet between the customer device and the authentication entity.

9. The method of claim 1, wherein the data is transaction data, the transaction data being input by the authentication entity processing portion directly from a merchant.

10. The method of claim of claim 9, the transaction data associated with a requested purchase of an item by the customer.

11. The method of claim 10, wherein the performing an authentication test including comparing the observed device attribute vis-à-vis the determined device attribute is performed based on at least one selected from the group consisting of date information, time information, merchant information, and geographical information.

12. The method of claim 1, wherein the customer device is a computer and the device attribute is a cookie.

13. The method of claim 1, wherein the securing a determined device attribute is performed in conjunction with a determination of which one customer device, out of a plurality of customer devices, is being used by the customer in the interaction, the authentication entity maintaining respective device attributes for each of the plurality of customer devices of the customer.

14. A system that authenticates a customer device, in conjunction with a requested interaction, the customer device associated with a customer, the system in the form of a tangibly embodied computer maintained by an authentication entity, the system including:
   a processing portion comprising at least one computer processor that receives data from the customer device, the data related to a requested interaction of the customer device with the authentication entity, wherein the data comprises a username and password;
   the processing portion, via at least one computer processor, configured to perform:
      inputting a device attribute, from the customer device, that constitutes an observed device attribute;
      securing a determined device attribute wherein the determined device attribute further comprises one or more of: date information, time information, merchant information and geographical information;
      performing an authentication test including comparing the observed device attribute vis-à-vis the determined device attribute; and
      based on the comparing, determining whether the authentication test is passed, and
         outputting approval of the requested interaction and a new device attribute to the customer device, if the authentication test is passed; and
         outputting disapproval of the requested interaction, if the authentication test is not passed; creating a varied device attribute by performing a calculation on the determined device attribute, based at least in part on whether the authentication test is passed; and performing an additional authentication test comparing the observed device attribute and the varied determined device attribute.

15. The system of claim 14, wherein the requested interaction is constituted by a request for a financial transaction.

16. The system of claim 14, wherein the customer device is a computer and the device attribute is a cookie.

17. A method of authenticating a customer device, in conjunction with a requested interaction, the customer device associated with a customer, the method performed by an authentication entity processing portion in the form of a tangibly embodied computer, the method including:
   receiving data from the customer device, the data related to a requested interaction of the customer device with the authentication entity processing portion, the authentication entity processing portion maintained by an authentication entity, wherein the data comprises a username and password;
   inputting a device attribute, from the customer device, that constitutes an observed device attribute;
   securing a determined device attribute wherein the determined device attribute further comprises one or more of: date information, time information, merchant information and geographical information;
   performing an authentication test including comparing the observed device attribute vis-à-vis the determined device attribute; and
   based on the comparing, determining whether the authentication test is passed, and
      outputting approval of the requested interaction and a new device attribute to the customer device, if the authentication test is passed; and
      outputting disapproval of the requested interaction, if the authentication test is not passed; creating a varied device attribute by performing a calculation on the determined device attribute, based at least in part on whether the authentication test is passed; and performing an additional authentication test comparing the observed device attribute and the varied determined device attribute;
   wherein the securing a determined device attribute includes the authentication entity processing portion retrieving the determined device attribute from a database of the authentication entity;
   wherein the securing a determined device attribute includes the authentication entity processing portion calculating the determined device attribute based on data retrieved from a database of the authentication entity;
   wherein the inputting a device attribute, from the customer device, that constitutes an observed device attribute including:

sending a query to the customer device, the query requesting a specific device attribute from the customer device; and inputting a query response, which constitutes a response to the query, from the customer device, the query response including the observed device attribute;

wherein the authentication entity is a bank;

wherein the requested interaction of the customer device with the authentication entity constituting a session over the Internet between the customer device and the authentication entity;

wherein the data is transaction data, the transaction data being input by the authentication entity processing portion directly from a merchant; and wherein the transaction data is associated with a requested purchase of an item by the customer.

* * * * *